Oct. 16, 1956    R. L. KAYE    2,766,469
AUTOMATIC CHAINER
Filed Jan. 11, 1951    6 Sheets-Sheet 1

INVENTOR
ROBERT LEE KAYE.
BY
Moore and Hall
Attys.

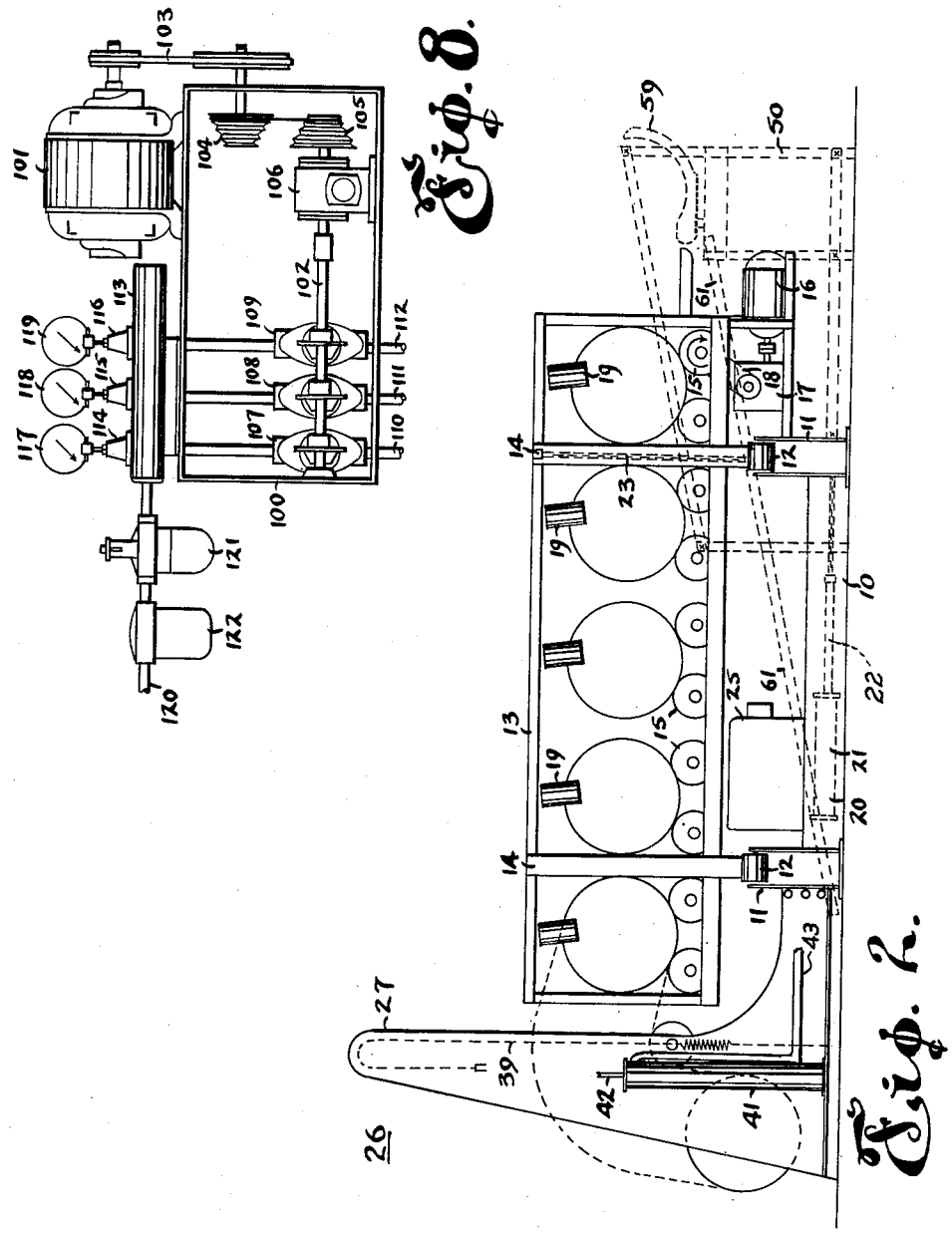

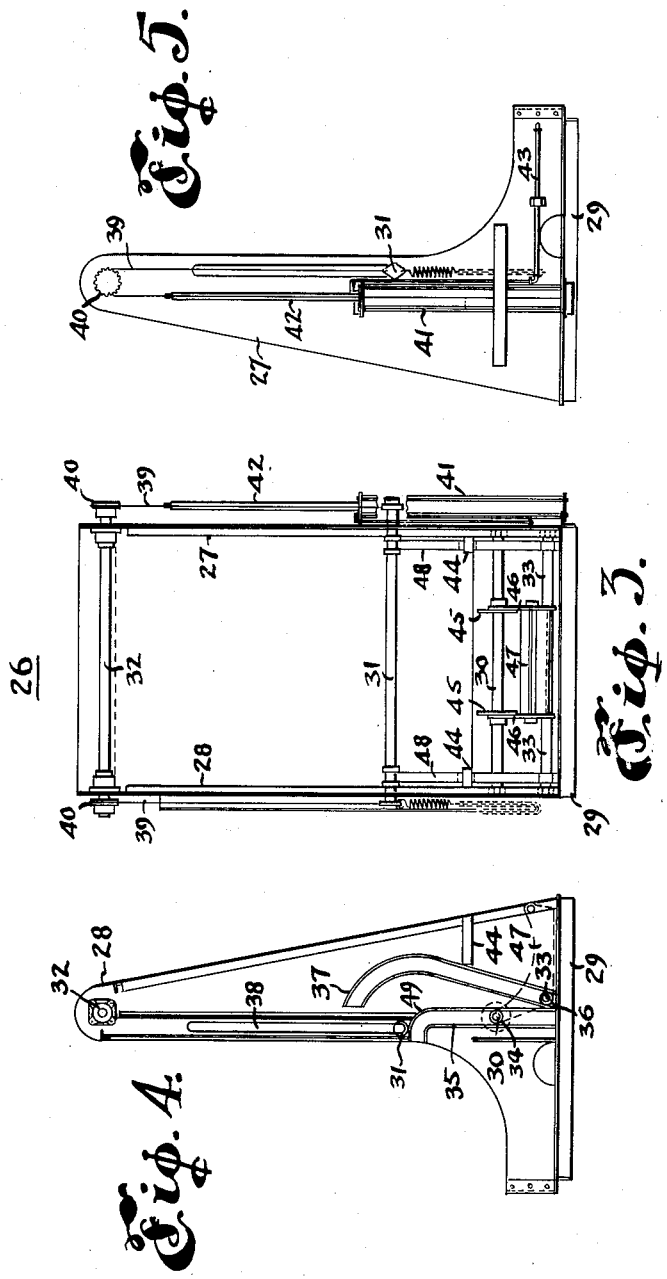

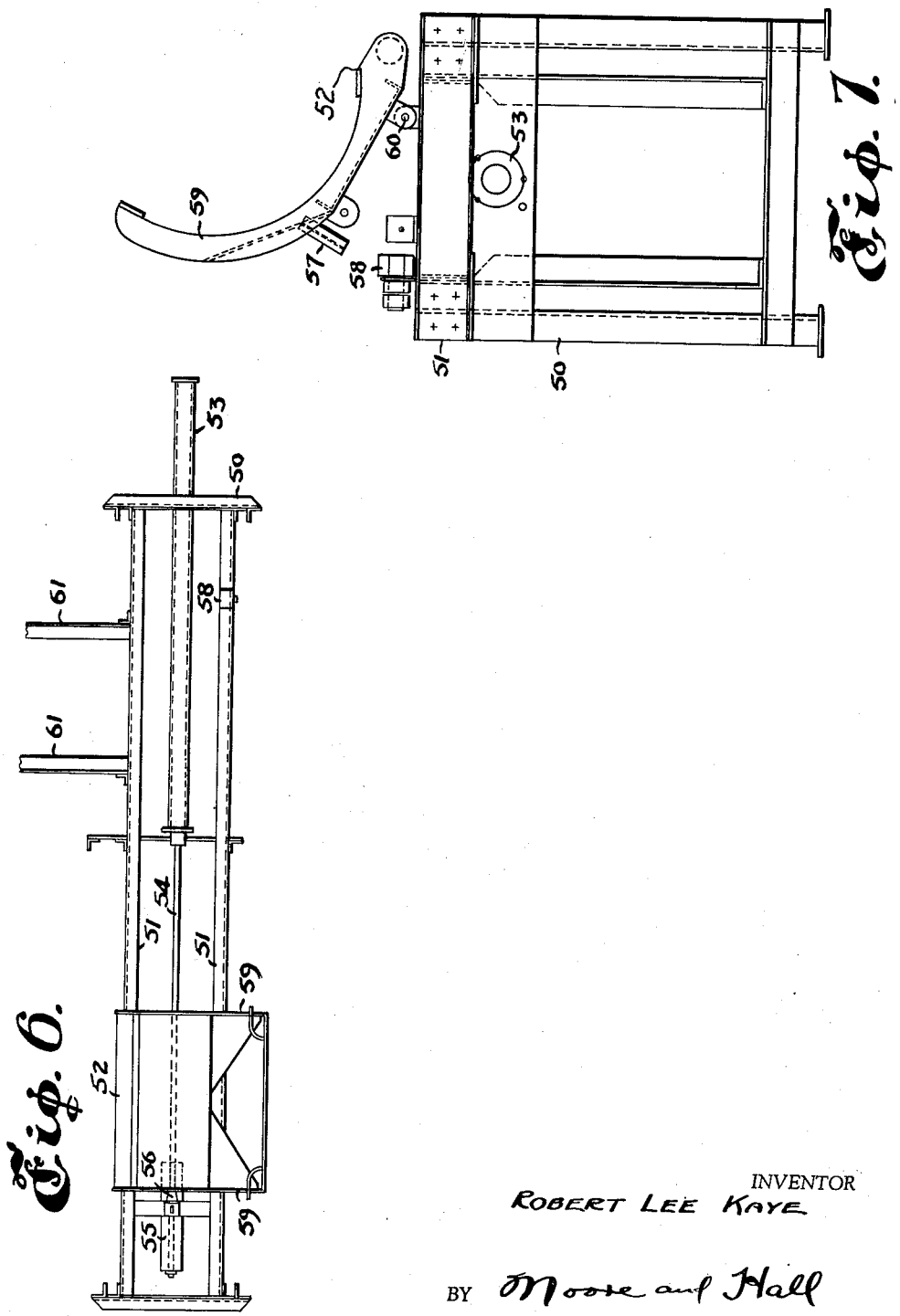

Oct. 16, 1956         R. L. KAYE         2,766,469
                    AUTOMATIC CHAINER
Filed Jan. 11, 1951                    6 Sheets—Sheet 5

INVENTOR
ROBERT LEE KAYE

BY  Moore & Hall

ATTORNEYS

Oct. 16, 1956  R. L. KAYE  2,766,469
AUTOMATIC CHAINER
Filed Jan. 11, 1951  6 Sheets-Sheet 6
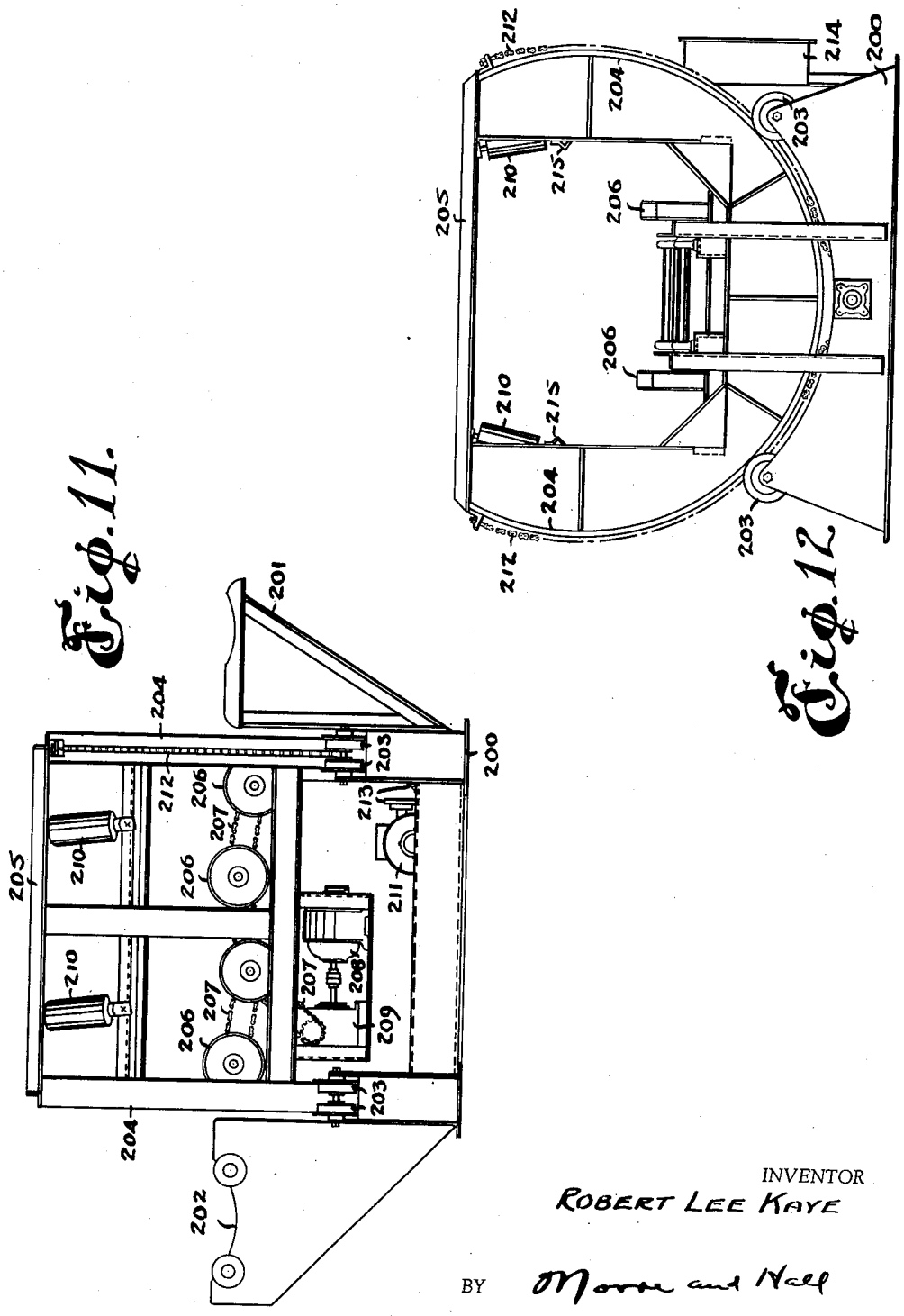
INVENTOR
ROBERT LEE KAYE
BY Moore and Hall
ATTORNEYS

United States Patent Office 2,766,469
Patented Oct. 16, 1956

2,766,469

AUTOMATIC CHAINER

Robert Lee Kaye, Newark, N. J.

Application January 11, 1951, Serial No. 205,472

5 Claims. (Cl. 15—3)

The present invention concerns the reconditioning of metal drums and similar containers for reuse and in particular the chaining of such drums and containers.

A certain percentage of drums to be reconditioned are coated on the inside with material that cannot be washed or scrubbed off by the machines performing those operations. Such material may be rust, heavy tars and asphalt, adherent cement and mortar, alkali resistant paints and coatings or the like. Such drums are termed "chainers" because they are rotated with a length of chains, steel balls or similar material inside which remove the undesired coating mechanically. The operation is termed "chaining."

It is an object of the invention to provide a fully automatic chainer which chains heads and body of a drum in one operation.

It is an object of the invention to provide a chainer having a drum cradle balanced in ball-bearing trunnion wheels to facilitate handling and operation and to tilt the drums from side to side so that the twenty-five pounds of chain or steel balls inside each drum will clean both heads as well as the side walls in a single operation.

It is an object of the invention to create a drum chainer which provides straight-line continuous operation for chain-cleaning bodies and heads of drums.

It is an object of the invention to provide a chainer of rocking cradle design in which the tilting of the cradle frame for head chaining is simple and effective.

It is an object of the invention to provide a chainer which may be supplied with drums by hand or which may be used in conjunction with an automatic feeder for loading and promoting drums through the chainer.

Other objects will appear as the description proceeds. In the drawings like numbers refer to like parts throughout.

Fig. 2 is a side elevation of another form of chainer with an integral loader and return means.

Fig. 3 is an end view of the chainer of Fig. 2.

Fig. 4 is a side view of the device shown in Fig. 3 viewed from the rear.

Fig. 5 is a side elevation of the loader shown in Fig. 3.

Fig. 6 is a plan view of one form of unloading arrangement.

Fig. 7 is a side elevation showing details of the unloading device of Fig. 6.

Fig. 8 is an elevation of a pneumatic timer arrangement.

Fig. 11 is a side elevation of another form of chainer.

Fig. 12 is an end view of the chainer of Fig. 11.

Like numerals refer to like parts throughout the specification.

Figure 1:
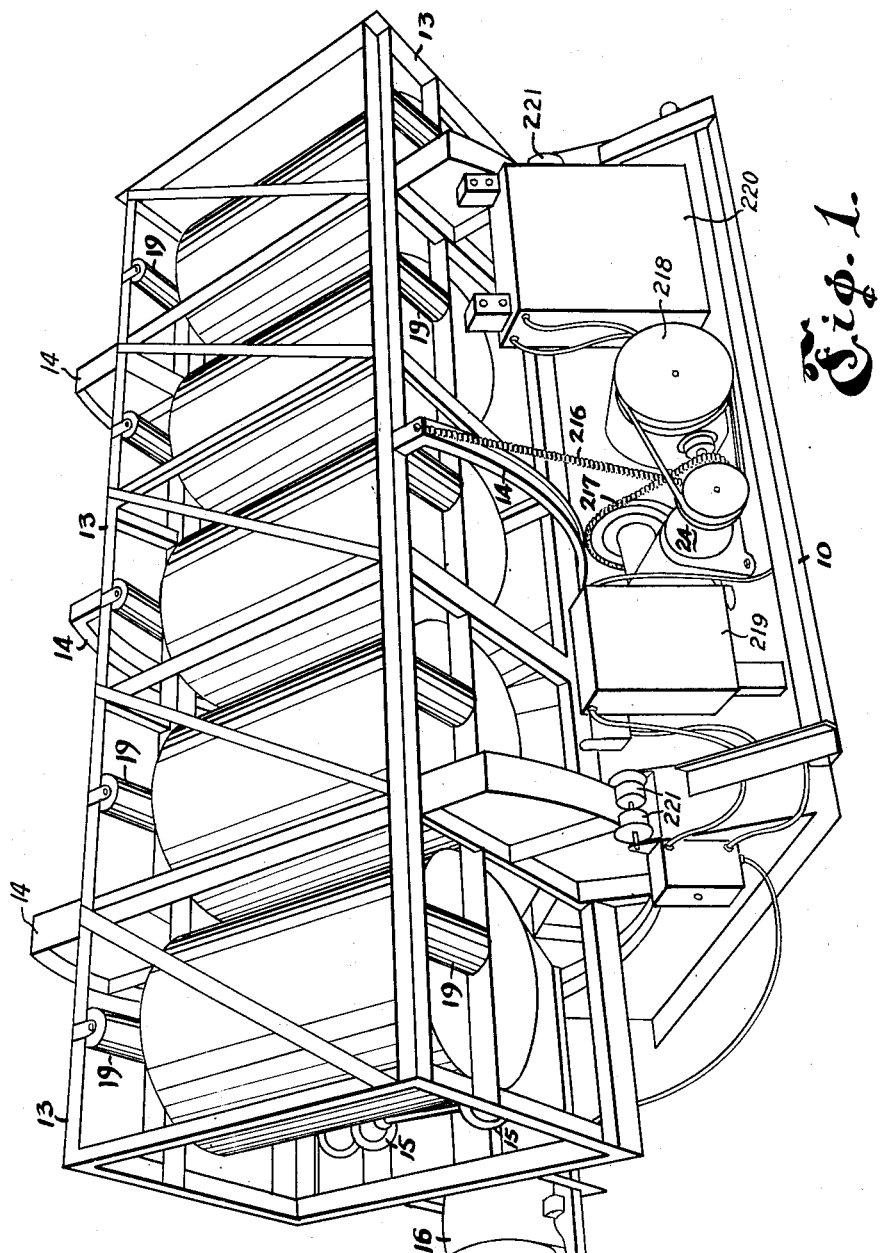
Fig. 1 is a perspective view of one form of chainer.

Figures 1 and 2 show slightly different models of the same device as actually constructed. The differences are minor and are shown to illustrate the invention and how details change as manufacturing progresses and cost becomes a production factor. Gear reducer 218 corresponds to 17 in Figure 2. In Figure 1 an electrical timer 219 corresponds to Figure 10 and a switch box 220 contains fuses and spare parts. Rollers 221 are intended to be the full equivalents of rollers 12.

Referring to Figure 2, a frame member 10 is provided with an arcuate carriage support 11 in which are journaled rollers 12 on which a cage-like structure 13 is mounted for oscillation. Cage 13 has arcuate rails 14 concentric with arcuate supports 11 which run on rollers 12 between suitable guides. A series of rolls 15 is located along the bottom of cage 13. Rolls 15 are supported in suitable bearings and driven by a motor 16, gear reducer 17 and chain 18. All the rolls 15 are chain driven in pairs and interconnected to the end roll driven by chain 18. Cage 13 carries vertical idler rolls 19 mounted on each side above pairs of rolls 15.

Figure 9:
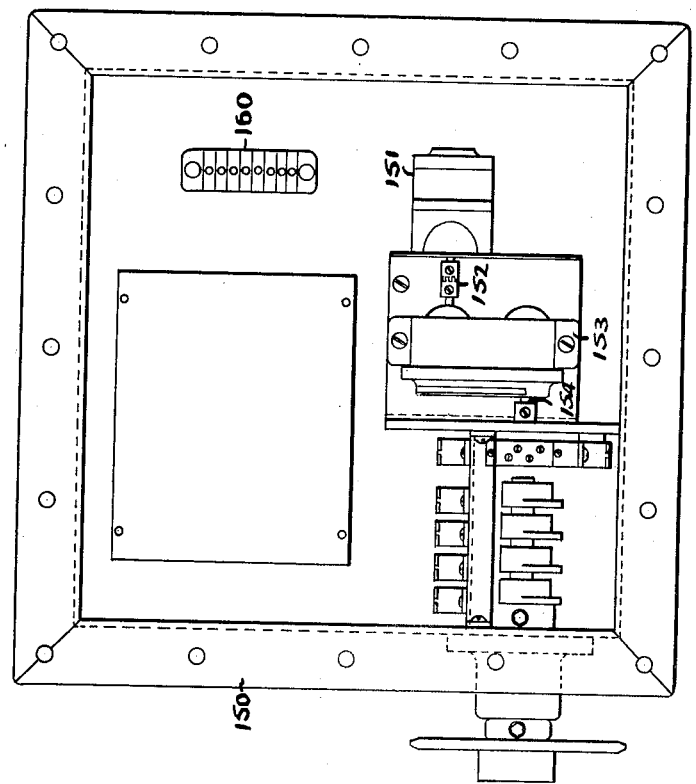
Fig. 9 is a plan view of an electric timing arrangement.
Figure 10:
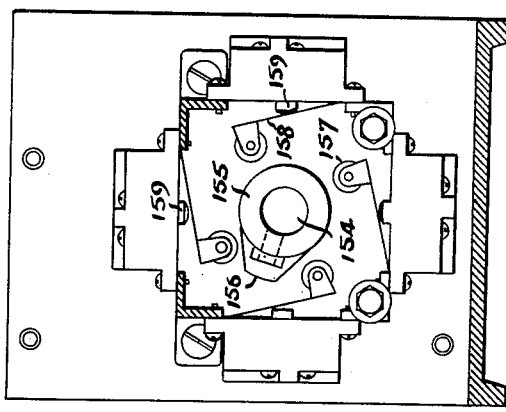
Fig. 10 is an enlarged detail of the electric timer of Fig. 9.

Cage 13 may be actuated by the hydraulic or pneumatic control shown in Fig. 8 or by an electric control shown in Figs. 9 and 10. Where, as in Figure 2, the pneumatic control and operation is employed a pair of cylinders 20, 21, shown one behind each other in Figure 2, have their piston rods 22 connected by suitable linkage to chains 23 anchored at the top of each end of one of the arcuate rails 14. The cylinders 20 and 21 work in sequence and rock cradle 13 by exerting a force first on one chain 23 and then the other on opposite sides of the same arcuate rail 14.

Where the electrical timer 25 of Figs. 9 and 10 is employed cradle 13 is rocked by a gear-head motor 24 which is mounted on base 10 and connected to arcuate rail 14 as shown in Figure 1.

Drums, as shown in Figure 2, are placed on the first pair of rolls 15 by a loader mechanism 26 which has a pair of upright members 27 and 28. Members 27 and 28 are mounted on a base 29 and have extending between them a first elevator shaft 30, a lift shaft 31, a top shaft 32 and a second elevator shaft 33.

Elevator shaft 30 is provided with a roller 34 at each end which rollers serve as cam followers and ride in cam channels or tracks 35. Elevator shaft 33 has similar rollers 36 which ride in cam channels 37. Cam tracks 35 and 37 have lower straight portions, but the upper section of tracks 35 are curved sharply while the corresponding portions of tracks 37 have a substantially greater radius of curvature as shown in Fig. 4.

Lift shaft 31 moves in slots 38 in upright members 27 and 28 and is lifted by two chains 39 fastened to its ends and running over sprockets 40 on top shaft 32 which is journaled in the upper ends of uprights 27 and 28. An air cylinder 41 has its piston rod 42 connected to one chain 39. Operation of cylinder 41 turns shaft 32 and so operates both chains 39 to lift both ends of lift shaft 31. Air line 43 supplies cylinder 41. Drum guides 44 are mounted on the inside of uprights 27 and 28. Elevator shaft 30 carries wheels 45 mounted within the arms 46 of cradle 47. Linkages 48 connect lift shaft 31 and elevator shaft 33.

Figs. 6 and 7 show in more detail the drum return attachment of Fig. 2. An elongate frame 50 is attached to frame 10 and is provided with track elements 51 on which rides a wheeled carriage 52 shaped, as shown in outline at the top of Figure 7, to carry a drum which has been chained. Carriage 52 is drawn by a long travel air cylinder 53, piston rod 54 of which is connected to the frame of carriage 52 by means of adjustable bumper assembly 55 having a rubber cone shaped member 56 in contact therewith. Carriage 52 may be spring returned or cylinder 53 may be made double acting. Carriage 52 has a projecting sloping member 57 which acts as a cam when in contact with cam follower roller 58. When carriage 52 is drawn smartly along tracks 51 by cylinder 53, inclined cam 57 strikes roller follower 58 causing drum cradle arms 59 to pivot about 60 and roll a drum down ramp 61 to floor level. Arms 59 will return to drum receiving position by their own weight as pivot 60 is well removed from the center of gravity of cradle arms 59, but spring return may be provided if desired.

Drum chainers of the type herein disclosed may be pneumatically or electrically controlled. A preferred form of pneumatic control is shown in Fig. 8 in which a frame 100 is attached to frame 10 and mounts a timer motor 101 which drives cam shaft 102 through belt 103, four-speed cone pulleys 104 and 105 and gear reducer 106. Cam shaft 102 operates valves 107, 108 and 109 which control the flow of air through air lines 110, 111 and 112 respectively. Air lines 110, 111 and 112 are connected to header 113 by regulator valves 114, 115 and 116 having gauges 117, 118 and 119, each respectively. Header 113 has a diameter which is large compared to the diameters of lines 110, 111 and 112 so that normal air flow will not cause a pressure drop below the highest pressure for which regulator valves 114, 115 and 116 may be adjusted. Header 113 is supplied by air supply line 120, having air line oil lubricator 121 and trap 122 connected thereto.

Air line 110 is connected to cylinder 41 through line 43. Air line 111 is connected to cylinder 53. Air line 112 is connected to cylinder 20. Where cradle 13 is not spring returned, but another cylinder 21 is used then cylinder 21 is connected to a fourth cam-valve-regulator unit similar to the three shown in Fig. 8.

Drums are supplied to cradle 47 at floor level and cylinder 41 is energized as valve 107 admits air to lines 110 and 43. The air pressure within cylinder 41 pulls rod 42 and chain 39 down. Shaft 32 and sprockets 40 cause both chains 39 to function. Chains 39 raise lift shaft 31 which slides in guide slots 38 in upright members 27 and 28. Lift shaft 31 is connected to cradle 47 and elevator shaft 33 by linkages 48. As lift shaft 31 rises in slots 38 linkage 48 carries elevator shaft 33 and cradle 47 along with it. The ends of elevator shaft 33 have rollers 36 which ride in curved tracks 37. As cradle 47 and the drum it carries are raised elevator shaft 30 which also has rollers 34 at its ends which ride in tracks 35 is likewise raised. Tracks 35 have sharp angle turns 49 at their upper ends which halt the upward motion of shaft 30 and cause cradle 47 to pivot about shaft 30 as lift shaft 31 and linkage 48 continue to raise elevator shaft 33. This turning action which is completed by the upper curved part of tracks 37 serves to dump the drum which has been lifted onto the driven rollers 15. Valve 107 may be provided with a lever so that it may be successively operated independently of cam shaft 102 so that the machine may be initially loaded. This action would, however, require the selection of drums needing less than normal chaining for the initial loading as these first drums would receive shorter treatment. In most installations it will be desirable to let the drums take their normal course. The drums are rotated under the action of rollers 15 which are driven by motor 16. As cylinder 41 supplies additional drums those already on rollers 15 are pushed along to the next pair of driven rollers 15. The drums each contain about twenty-five pounds of chain or steel balls, which effect the cleaning or "chaining" action.

At frequent intervals the cam operating valve 109 admits air to line 112 and actuates cylinder 20 which rocks frame 13 on rollers 12 and causes the drums to tilt to one side and ride on rollers 19. This action cleans the heads. Where spring return of cage 13 is employed, valve 109 and its cam will need to provide for a level position of cage 13 for a substantial time. The use of a second cylinder 21 provides positive action and control to this end. In any event cage 13 has three operating positions which are level, right tilt and left tilt, so that all portions of the inside of a drum may be thoroughly cleaned. The tilting means thus tilts the frame intermittently with intervening untilted periods.

Once the device is full of drums each time cylinder 41 supplies another drum a cleaned drum is pushed off onto cradle 52 which is then pulled on its wheels down tracks 51 by cylinder 53 which has been supplied with air through pipe 111 and its cam controlled valve 108. As cradle 52 rolls opposite ramp 61 inclined surface or cam 57 strikes roller 58, pivoting cradle arms 59 about pivot 60 and dumping the cleaned drum down ramp 61 where it rolls to the floor. As soon as valve 108 closes cradle 52 is returned to drum receiving position by spring action. Cam shaft 102 is timed to allow for cleaning the dirtiest drums. In general good results may be obtained by having valves 107, 108 and 109 operate once for every revolution of cam shaft 102.

An electrical timer for the present invention is shown in Figs. 9 and 10 wherein a frame 150 mounts a six R. P. M. gearhead motor 151 connected by coupling 152 to a variable speed reducer 153. The output shaft 154 of speed reducer 153 carries a cam 155 having a rise 156 arranged to act upon spring mounted cam follower rollers 157 and press the leaf springs 158 against their respective contact buttons 159 and close sequentially the circuits connected thereto. These circuits perform the same functions described in detail in connection with the pneumatic control of Fig. 8 by the use of electric servomotors instead of air cylinders. That is, drums to be cleaned are loaded by one contact which actuates an electric servo replacing air cylinder 41, cage 13 is rocked by two servos replacing cylinders 20 and 21 and cradle 52 is operated by a servo replacing cylinder 53. The servos replacing cylinders 20 and 21 actuate bands on brake controlled gear head motor 24. Leaf springs 158 and buttons 159 are connected to terminal block 160 and so to the servos to be controlled.

Figs. 11 and 12 show a two drum automatic chainer having a frame 200 with a loader ramp 201 on one side and a discharge ramp 202 on the other. Frame 200 is arcuate on its top and mounts four pairs of chilled rim-flanged cradle wheels 203 on which ride the circular tilt frame cradle members 204 of tilting cage 205. Cage 205 carries eight rubber covered driven rollers 206 connected by chains 207 and driven by motor 208 acting through gear reducer 209. Vertical chime or idler rollers 210 are mounted near the top of cage 205 and support the heads of the drums for rotation when tilted.

Cage tilt drive motor 211 is controlled by an electric brake and rocks cage 205 by means of chain 212 and the gearing and sprocket cluster 213 of well known construction.

Timer mechanism 214 is an electric control for brake position control 213 and causes motor 211 to rotate the sprocket cluster and rock cage 205 left and right at an angle of forty-five degrees. Angle drum guides 215 keep drums in line when cage 205 is level. When the cage is tilted the chimes of the drums ride on one or the other of rollers 210.

The tilt chain 216 of Fig. 1 is the counterpart of chain 212 of Fig. 11. In the same way brake position controlled motors 24 and 211 are similar as are also drive 217 and 213, respectively.

While there has been described what is at present considered to be the preferred embodiment of this invention, as shown in Figure 2, it will be obvious to those skilled in the art that various changes and modifications may be made therein without departing from the invention, and it is therefore intended in the appended claims to cover in generic terms all such changes and modifications as fall within the true spirit and scope of the invention.

I claim:

1. In combination in a device for chaining drums, a base mounting, a movable frame having arcuate track members, roller means journaled on said base and supporting said movable frame on said arcuate track members for movement about the longitudinal axis of said frame, means to tilt said frame from side to side about said longitudinal axis, a plurality of pairs of driven rollers mounted in the lower part of said frame and movable therewith, said driven rollers being spaced apart a suitable distance and suitably mounted for supporting and rotating drums to be chained, idler rollers mounted on said frame and movable therewith, said idler rollers being likewise suitably spaced apart and mounted at an angle to said driven rollers so as to support the chimes of drums to be cleaned when said frame is tilted, and timing means connected to said means to tilt to control the tilting of said frame.

2. The combination set forth in claim 1, said means to tilt said movable frame being so constructed and arranged that said frame is tilted intermittently with intervening untilted periods.

3. The combination set forth in claim 2, said means to tilt said movable frame comprising flexible means extending around said movable frame and fastened thereto.

4. The combination set forth in claim 2, said movable frame member being cylindrical in major part and having its longitudinal axis mounted normally in a horizontal position.

5. The combination set forth in claim 2, said idler rollers being mounted on substantially diametrically opposite sides of said frame in cooperating pairs.

References Cited in the file of this patent

UNITED STATES PATENTS

| | | |
|---|---|---|
| 826,657 | Halvorson et al. | July 24, 1906 |
| 962,370 | Malik | June 21, 1910 |
| 1,012,713 | Russell | Dec. 26, 1911 |
| 1,121,871 | Romberg | Dec. 22, 1914 |
| 1,212,587 | Van Horn | Jan. 16, 1917 |
| 1,565,154 | Hug | Dec. 8, 1925 |
| 1,817,343 | Bledsoe | Aug. 4, 1931 |
| 2,156,695 | Klein | May 2, 1939 |
| 2,395,593 | Trager | Feb. 26, 1946 |
| 2,454,924 | Hurst | Nov. 30, 1948 |
| 2,517,787 | Hanby | Aug. 8, 1950 |
| 2,592,324 | Oliver | Apr. 8, 1952 |

FOREIGN PATENTS

| | | |
|---|---|---|
| 145,431 | Switzerland | May 1, 1931 |